US00RE50465E

(19) United States
(12) Reissued Patent
Gorrara et al.

(10) Patent Number: US RE50,465 E
(45) Date of Reissued Patent: Jun. 24, 2025

(54) AUTOMATED STEERING OF A DRILLING SYSTEM USING A SMART BOTTOM HOLE ASSEMBLY

(71) Applicant: NABORS LUX 2 SARL, Luxembourg (LU)

(72) Inventors: Andrew Gorrara, Sandnes (NO); Ola Stengel, Sandnes (NO); Knut-arve Johnsen, Sandnes (NO)

(73) Assignee: NABORS DRILLING TECHNOLOGY USA, LLC, Houston, TX (US)

(21) Appl. No.: 17/900,019

(22) Filed: Aug. 31, 2022

Related U.S. Patent Documents

Reissue of:
(64) Patent No.: 10,760,341
Issued: Sep. 1, 2020
Appl. No.: 16/128,037
Filed: Sep. 11, 2018

(51) Int. Cl.
*E21B 7/06* (2006.01)
*E21B 7/04* (2006.01)
*E21B 44/00* (2006.01)
*E21B 47/022* (2012.01)

(52) U.S. Cl.
CPC ..... *E21B 7/06* (2013.01); *E21B 7/04* (2013.01); *E21B 44/00* (2013.01); *E21B 44/005* (2013.01); *E21B 47/022* (2013.01)

(58) Field of Classification Search
CPC ..... E21B 47/022; E21B 7/04; E21B 44/005; E21B 7/06; E21B 44/00
See application file for complete search history.

(56) References Cited

U.S. PATENT DOCUMENTS

| | | | | |
|---|---|---|---|---|
| 9,428,961 | B2 | 8/2016 | Benson et al. | |
| 10,508,530 | B2 * | 12/2019 | Gillan | E21B 47/09 |
| 2009/0000823 | A1 * | 1/2009 | Pirovolou | E21B 7/04 175/61 |
| 2015/0096805 | A1 * | 4/2015 | Kruspe | E21B 47/095 175/45 |
| 2015/0107903 | A1 * | 4/2015 | Sugiura | E21B 7/06 175/45 |

(Continued)

FOREIGN PATENT DOCUMENTS

| | | | | |
|---|---|---|---|---|
| EP | 2859171 | * 3/2019 | | E21B 21/08 |
| WO | WO 207/095959 | A1 * 6/2017 | | E21B 4/02 |

*Primary Examiner* — William C Doerrler
(74) *Attorney, Agent, or Firm* — Haynes and Boone, LLP

(57) ABSTRACT

A method of drilling a wellbore is described using a BHA including an RSS that comprises an adjustment mechanism movable between first and second configurations to alter a drilling direction of the BHA, BHA sensor(s), and a controller. The method includes drilling, using the BHA, the wellbore with the adjustment mechanism in the first configuration; receiving, by the first controller, real-time data including inclination and azimuth angle data from the BHA sensor(s); determining, by the first controller and based on the real-time data, a relationship between an actual measurement and a target measurement that is associated with a target well path; automatically moving, by the first controller and in response to the determination of the relationship, the adjustment mechanism from the first to the second configuration; and drilling, using the BHA, the wellbore while the adjustment mechanism is in the second configuration.

32 Claims, 5 Drawing Sheets

(56) References Cited

U.S. PATENT DOCUMENTS

| | | | | |
|---|---|---|---|---|
| 2015/0377004 | A1* | 12/2015 | Hornblower | E21B 47/022 175/24 |
| 2016/0160628 | A1* | 6/2016 | Sugiura | E21B 47/022 700/275 |
| 2016/0305230 | A1* | 10/2016 | Benson | E21B 47/06 |
| 2017/0037722 | A1* | 2/2017 | Jeffryes | E21B 4/02 |
| 2017/0058658 | A1* | 3/2017 | Spencer | E21B 7/04 |
| 2017/0243383 | A1* | 8/2017 | Gillan | G06F 3/14 |
| 2019/0085683 | A1* | 3/2019 | Gillan | E21B 47/12 |
| 2019/0178043 | A1* | 6/2019 | Boone | E21B 47/16 |
| 2019/0178073 | A1* | 6/2019 | Boone | E21B 44/00 |
| 2019/0186253 | A1* | 6/2019 | Peter | E21B 47/024 |
| 2019/0323333 | A1* | 10/2019 | Ellis | E21B 47/024 |
| 2019/0330968 | A1* | 10/2019 | Boone | E21B 7/04 |
| 2019/0353023 | A1* | 11/2019 | Whitacre | G01V 3/38 |
| 2019/0353024 | A1* | 11/2019 | Papouras | E21B 47/00 |
| 2020/0109623 | A1* | 4/2020 | Vinay | E21B 47/06 |

* cited by examiner

400

| TYPE OF UNPLANNED, DYNAMIC WELL EVENT | SENSOR DETECTIONS | FIRST MITIGATING ACTION | SECOND MITIGATING ACTION |
|---|---|---|---|
| STICK-SLIP EVENT (TORSIONAL OR LATERAL VIBRATION) | SURFACE SENSORS: LARGE SURFACE TORQUE FLUCTUATIONS OVER PREDETERMINED PERIOD OF TIME (e.g., THREE TO TEN SECONDS) BHA SENSORS: HIGH SHOCK VALUES | INCREASE RPM AND DECREASE WOB BY PREDETERMINED % | PICK UP BHA FROM BOTTOM; GO STATIC; WORK PIPE; RESUME WITH CHANGED PARAMETERS |
| BHA WHIRL (LATERAL VIBRATION) | SURFACE SENSORS: CONTINUOUS ELEVATED VIBRATION READINGS AND VIBRATIONS AT SURFACE BHA SENSORS: LARGE DOWNHOLE SHOCKS | DECREASE RPM AND INCREASE WOB BY PREDETERMINED % | PICK UP BHA FROM BOTTOM; GO STATIC; WORK PIPE; RESUME WITH CHANGED PARAMETERS |
| BIT WHIRL (LATERAL VIBRATION) | BHA SENSORS: LARGE DOWNHOLE SHOCKS, CONTINUOUS VIBRATION MAY NOT OCCUR | DECREASE RPM AND INCREASE WOB BY PREDETERMINED % | PICK UP BHA FROM BOTTOM; GO STATIC; WORK PIPE; RESUME WITH CHANGED PARAMETERS |
| BIT BOUNCING (AXIAL VIBRATION) | SURFACE SENSORS: TOP DRIVE OR KELLY SHAKING, FLUCTUATING SURFACE WOB/HOOKLOAD | DECREASE RPM AND INCREASE WOB BY PREDETERMINED % | |
| LATERAL SHOCKS (+30G LATERAL VIBRATION EVENTS) | MEDIUM TO HIGH VIBRATIONS WITH OCCASIONAL HIGH SHOCK OCCURRENCES | CHANGE RPM AND CHANGE WOB BY PREDETERMINED % | PICK UP BHA FROM BOTTOM; GO STATIC; WORK PIPE; RESUME WITH LOWERED RPM |

Fig. 4

AUTOMATED STEERING OF A DRILLING SYSTEM USING A SMART BOTTOM HOLE ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

At the outset of a drilling operation, drillers typically establish a drilling plan that includes a target location and a drilling path, or well plan, to the target location. Once drilling commences, the bottom hole assembly ("BHA") is directed or "steered" from a vertical drilling path in any number of directions, to follow the proposed well plan. For example, to recover an underground hydrocarbon deposit, a well plan might include a vertical section to a point above the reservoir, then a directional section and deviated or horizontal section that penetrates the deposit. The drilling operator may then steer the BHA, including the bit, through the vertical, directional and horizontal aspects in accordance with the plan.

In some embodiments, directional control of the BHA can be via a "push-the-bit" method, which involves applying to the bit a radial force which is designed to drive the bit to drill at a certain deviation in a desired direction in relation to the center axis of the bit. Direction and deflection can be adjusted continuously, even whilst the drilling string rotates. Conventionally, and when a drilling operator provides instructions to the BHA and other drilling equipment, the drilling operator draws on his or her past experiences and the performance of the well to create the instructions based on conditions in the well and/or historical performance of the current well or similar wells. This is a very subjective process that is performed by the drilling operator and that is based on his or her judgment. In some instances, the creation of the instructions by the drilling operator is not optimal. As a result, any one or more is a result: the tortuosity of the actual well path is increased, which increases the difficulty of running downhole tools through the wellbore and increases the likelihood of damaging any future casing that is installed in the wellbore; and the actual drilling path differs significantly from the well plan. Moreover, the time required for the BHA to relay data from the BHA to the surface, for the drilling operator to review the data and create new instructions, and for the instructions to be relayed back down to the BHA, results in further deviation from the target well path. Thus, a method and apparatus for the BHA and/or drilling rig to automatically create instructions is needed.

SUMMARY

A method is described that includes drilling a wellbore using a bottom hole assembly ("BHA") that includes a rotary steerable system (RSS) that includes an adjustment mechanism, BHA sensor(s), and a first controller, the method including: drilling, using the BHA, the wellbore when the adjustment mechanism is in a first configuration; wherein the adjustment mechanism is movable between at least the first configuration and a second configuration to alter a drilling direction of the BHA; receiving, by the first controller, real-time feedback data from the BHA sensor(s); wherein the real-time feedback data includes inclination angle data and azimuth angle data; determining, by the first controller and based on the real-time feedback data, a relationship between an actual measurement derived from the real-time feedback data and a target measurement that is associated with a target well path; wherein the actual measurement includes an actual inclination angle and an actual azimuth angle; and wherein the target measurement includes a target inclination angle and a target azimuth angle; automatically moving, by the first controller and in response to the determination of the relationship, the adjustment mechanism from the first configuration to the second configuration; and drilling, using the BHA, the wellbore while the adjustment mechanism is in the second configuration. In one embodiment, the BHA sensor(s), the adjustment mechanism, and the first controller form a first closed-loop control system in which the input is the target inclination angle and a second closed-loop control system in which the input is the target azimuth angle. In one embodiment, the actual measurement is an actual position and the target measurement is a target position, and the method further includes storing the target well path in the first controller; receiving, by the first controller, depth data relating to the depth of the BHA in the wellbore; and determining the actual measurement based on the depth data and the real-time feedback data from the BHA sensor(s); wherein the actual measurement further includes an actual build rate and an actual turn rate; and wherein the target measurement further includes a target build rate and a target turn rate. In one embodiment, drilling the wellbore while the adjustment mechanism is in the second configuration includes moving the BHA towards the target well path. In one embodiment, the real-time feedback data further includes lithologic related data; wherein the actual measurement further includes an actual lithology measurement of a formation through which the wellbore extends; wherein the target measurement further includes a target lithology associated with a portion of the target well path; and wherein drilling the wellbore while the adjustment mechanism is in the second configuration further includes moving the BHA towards a revised target well path that is based on the actual lithology measurement and the target lithology. In one embodiment, the method also includes monitoring a drilling parameter using surface sensor(s) positioned at or near a surface of a well that is associated with the wellbore and/or using the BHA sensor(s); detecting, using a second controller that is positioned at or near the surface and that is operably coupled to the surface sensor(s), a drilling event based on the monitored drilling parameter; and automatically, using the second controller, mitigating the drilling event in response to the detection of the drilling event. In one embodiment, automatically, using the second controller, mitigating the drilling event includes: lifting, using the second controller, a drill string that is coupled to the BHA to lift the BHA off a bottom of the wellbore; repetitively moving, using the second controller, the pipe vertically and/or rotationally while the BHA is lifted off bottom; and lowering, using the second controller, the drill string such that the BHA touches the bottom of the well bore. In one embodiment, a third controller is positioned at or near a surface of the well; and the method further includes: determining, by the third controller, that the adjustment mechanism should move between the first and second configurations; and automatically downlinking in response to the determination, from the third controller to the first controller, instructions to move the adjustment mechanism between the first configuration and the second configuration. In one embodiment, the method also includes continuously determining using an algorithm, by the first controller and based on the real-time feedback data, the relationship between the actual measurement and the target measurement. In one embodiment, the BHA sensor(s) comprise a first sensor and a second sensor spaced along a longitudinal axis of the BHA; wherein the method further includes: comparing, by the first controller, the real-time feedback data from the first sensor and the real-time feedback data from the second sensor to determine a difference; and determining, by the first controller and using the difference, the actual measurement. In one embodiment, wherein the BHA sensor(s) include a first sensor configured to detect inclination angle data; and a second sensor configured to detect data relating to a distance travelled by the BHA; wherein receiving, by the first controller, real-time feedback data from the BHA sensor(s) comprises receiving the inclination angle data from the first sensor and receiving the data relating to the distance travelled by the BHA from the second sensor; wherein the method further comprises: calculating, by the first controller, and based on the data relating to the distance travelled by the BHA, a distance travelled by the BHA; and calculating, by the first controller, and based on the distance travelled by the BHA and the inclination angle data, an actual dogleg severity.

An apparatus is described that is adapted to drill a wellbore including: a bottom hole assembly ("BHA") that includes: an adjustment mechanism that is movable between at least a first configuration and a second configuration to alter a drilling direction of the BHA; BHA sensor(s) that monitor real-time feedback data that includes inclination angle data and azimuth angle data, and a first controller in communication with the BHA sensor(s); wherein the first controller is configured to: receive the inclination angle data and the azimuth angle data from the BHA sensor(s); determine, based on the inclination angle data and the azimuth angle data, a relationship between an actual measurement derived from the real-time feedback data and a target measurement that is associated with a target well path; wherein the actual measurement includes an actual inclination angle and an actual azimuth angle; and wherein the target measurement includes a target inclination angle and a target azimuth angle; automatically move, in response to the determination of the relationship, the adjustment mechanism from the first configuration to the second configuration to alter a drilling direction of the BHA. In one embodiment, the BHA sensor(s), the adjustment mechanism, and the first controller form a first closed-loop control system in which the input is the target inclination angle and a second closed-loop control system in which the input is the target azimuth angle. In one embodiment, the actual measurement is an actual position and the target measurement is a target position; and the first controller is further configured to: store the target well path; receive depth data relating to the depth of the BHA in the wellbore; and determine the actual position based on the depth data and the real-time feedback data from the BHA sensor(s); wherein the actual position further includes an actual build rate and an actual turn rate; and wherein the target position further includes a target build rate and a target turn rate. In one embodiment, drilling the wellbore while the adjustment mechanism is in the second configuration includes moving the BHA towards the target well path. In one embodiment, the real-time feedback data further includes lithologic related data; wherein the actual measurement further includes an actual lithology measurement of a formation through which the wellbore extends; wherein the target measurement further includes a target lithology associated with a portion of the target well path; and wherein the first controller is further configured to automatically move, in response to the determination of the relationship, the adjustment mechanism from the first configuration to the second configuration to alter a drilling direction of the BHA towards a revised target well path that is based on the actual lithology measurement and the target lithology. In one embodiment, the apparatus also includes a surface sensor(s) positioned at or near a surface of a well that is associated with the wellbore, wherein the surface sensor and/or the BHA sensor(s) is configured to monitor a drilling parameter; and a second controller that is positioned at the surface and that is in communication with the surface sensor(s), wherein the second controller is configured to detect a drilling event based on the monitored drilling parameter. In one embodiment, the second controller is further configured to, in response to the detection of a drilling event adjust the drilling parameters in accordance to an algorithm or selection matrix that depends on the measurements detected and the changes to the measurements. In some embodiments, this includes lifting a drill string that is coupled to the BHA to lift the BHA off a bottom of the wellbore; repetitively moving the pipe vertically and/or rotationally while the BHA is lifted off bottom; and lowering the drill string such that the BHA touches the bottom of the well bore. In one embodiment, a third controller that is positioned at a surface of a well that is associated with the wellbore, wherein the third controller is configured to: determine that the adjustment mechanism should move between the first and second configurations; and automatically downlink in response to the determination, from the third controller to the first controller, instructions to move the adjustment mechanism between the first configuration and the second configuration. In one embodiment, the first controller is further configured to continuously determine, using an algorithm and based on the real-time feedback data, the relationship between the actual measurement and the target measurement. In one embodiment, the BHA sensor(s) include a first sensor and a second sensor spaced along a longitudinal axis of the BHA; wherein the first controller is further configured to: compare the real-time feedback data from the first sensor and the real-time feedback data from the second sensor to determine a difference; and determine, using the difference, the actual measurement. In one embodiment, wherein the BHA sensor(s) include: a first sensor configured to detect inclination angle data; and a second sensor configured to detect data relating to a distance travelled by the BHA; wherein the first controller is further configured to: receive the data relating to the distance travelled by the BHA from the second sensor; calculate, based on the data relating to the distance travelled by the BHA, a distance travelled by the BHA; and calculate, based on the distance travelled by the BHA and the inclination angle data, an actual dogleg severity.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4 illustrates a table used during the method of FIG. 3, according to one or more aspects of the present disclosure.

DETAILED DESCRIPTION

Figure 1:
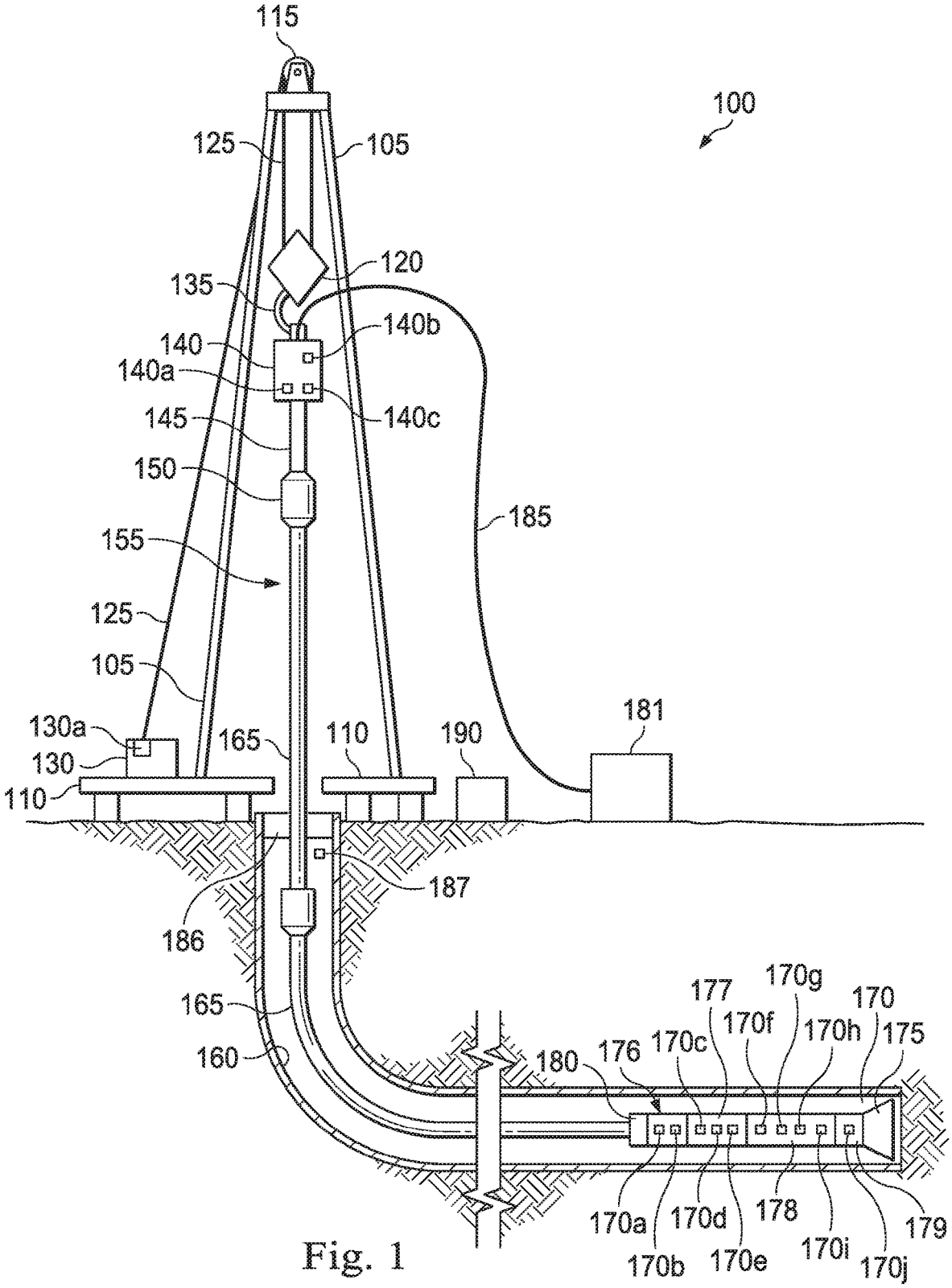
FIG. 1 is a schematic diagram of a drilling rig apparatus including a bottom hole assembly ("BHA") according to one or more aspects of the present disclosure.

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The apparatus and methods disclosed herein automate the control of a rotary steerable system ("RSS"), resulting in increased efficiency and speed during rotary steerable drilling compared to conventional systems that require significantly more manual input or pauses to provide for input. Conventionally, and when a drilling operator controls a drilling tool such as the BHA and other drilling equipment, the drilling operator draws on his or her past experiences and the performance of the well to determine the appropriate response to drilling events such as deviation from the actual well path and stick-slip events and other unplanned drilling events. This is a very subjective process that is performed by the drilling operator and that is based on his or her judgment. For the drilling operator to determine the appropriate response and then determine the appropriate instructions that will result in the desired response takes time, during which the BHA may further deviate from the target well path or during which drilling is suspended. Moreover, in some instances, the creation of the instructions by the drilling operator is not optimal or consistent with previous experience. As a result, any one or more is a result: the tortuosity of the actual well path is increased, which increases the difficulty of running downhole tools through the wellbore and increases the likelihood of damaging any future casing that is installed in the wellbore; the actual drilling path differs significantly from the well plan; and drilling tools are damaged. Thus, the apparatus and methods disclosed herein automate the creation, downlinking, and/or execution of RSS instructions. Specifically, the apparatus and methods disclosed herein relate to an automated drilling system that includes a smart drilling rig with controllers for all aspects of the topsides drilling process and sensors that monitor every parameter that can be controlled. In addition to the smart drilling rig there is a smart drilling BHA, for example including an RSS with a built-in controller and control software/system. This smart drilling BHA can be programmed to drill in a certain way and has a range of commands that can be downlinked to the system that will cause it to modify its behavior as required. The way in which the smart drilling BHA and the smart drilling rig can be combined to work together results in complete automation of the drilling process.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to draw works 130, which is configured to reel out and reel in the drilling line 125 to cause the traveling block 120 to be lowered and raised relative to the rig floor 110. The draw works 130 may include a rate of penetration ("ROP") sensor 130a, which is configured for detecting an ROP value or range, and a controller to feed-out and/or feed-in of a drilling line 125. The other end of the drilling line 125, known as a dead line anchor, is anchored to a fixed position, possibly near the draw works 130 or elsewhere on the rig.

A hook 135 is attached to the bottom of the traveling block 120. A top drive 140 is suspended from the hook 135. A quill 145, extending from the top drive 140, is attached to a saver sub 150, which is attached to a drill string 155 suspended within a wellbore 160. Alternatively, the quill 145 may be attached to the drill string 155 directly.

The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165 and a BHA 170, which includes a drill bit 175. The BHA 170 may include one or more measurement-while-drilling ("MWD") or wireline conveyed instruments 176, flexible connections 177, optional motors 178, adjustment mechanisms 179, a controller 180, stabilizers, and/or drill collars, among other components. One or more pumps 181 may deliver drilling fluid to the drill string 155 through a hose or other conduit 185, which may be connected to the top drive 140. For the purpose of rotary steering drilling, the adjustment mechanism 179 adjusts drilling direction and angular deflection during drilling. In some embodiments, the adjustment mechanism 179 has an outer shaft that is rotatably arranged relative to an outer housing and is configured with an axial eccentric first bore having a first bore axis that is parallel to the center axis. The adjustment mechanism 179 further includes an inner shaft that is rotatably arranged in the first bore and is configured with an axial, eccentric second bore for passage of a drive shaft for the drill bit 175.

In some embodiments, the adjustment mechanism is movable between at least a first configuration and a second configuration to alter a drilling direction of the BHA. In some embodiments, when in the first configuration, the outer shaft is offset from the outer housing such that the first bore axis is offset from the center axis in a first direction. In some embodiments, when in the second configuration, the outer shaft is offset from the outer housing such that the first bore axis is offset from the center axis in a second direction that is different from the first direction or is offset by a different amount but in the same first direction. In some embodiments, when in the second configuration, the outer shaft is not offset from the outer housing and the first bore axis is aligned with the center axis. However, any type of adjustment mechanism may be substituted for the adjustment mechanism 179 described here. For example, the adjustment mechanism 179 may be any type of "push-the-bit" type of tool that is capable of being adjusted while downhole. In some embodiments, the adjustment mechanism 179 is the adjustment mechanism as described in U.S. Pat. No. 9,644,427 to Tore Kvalvik, the entire disclosure of which is hereby incorporated herein by reference.

The downhole MWD or LWD 176 may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, sent to the controller 180, and downloaded from the instrument(s) at the surface and/or transmitted real-time to the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, and/or transmission as electromagnetic pulses. The MWD tools and/or other portions of the BHA 170 may have the ability to store measurements for later retrieval via wireline and/or when the BHA 170 is tripped out of the wellbore 160.

In an example embodiment, the apparatus 100 may also include a rotating blow-out preventer ("BOP") 186, such as if the wellbore 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 186. The apparatus 100 may also include a surface casing annular pressure sensor 187 configured to detect the pressure in the annulus defined between, for example, the wellbore 160 (or casing therein) and the drill string 155. It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

In the example embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 may include a downhole annular pressure sensor 170a coupled to or otherwise associated with the BHA 170. The downhole annular pressure sensor 170a may be configured to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. These measurements may include both static annular pressure (pumps off) and active annular pressure (pumps on).

The apparatus 100 may additionally or alternatively include a shock/vibration sensor 170b that is configured for detecting shock and/or vibration in the BHA 170. The apparatus 100 may additionally or alternatively include a mud motor delta pressure ($\Delta P$) sensor 170c that is configured to detect a pressure differential value or range across the one or more optional motors 178 of the BHA 170. In some embodiments, the mud motor $\Delta P$ may be alternatively or additionally calculated, detected, or otherwise determined at the surface, such as by calculating the difference between the surface standpipe pressure just off-bottom and pressure once the bit touches bottom and starts drilling and experiencing torque. The one or more motors 178 may each be or include a positive displacement drilling motor that uses hydraulic power of the drilling fluid to drive the bit 175, also known as a mud motor. One or more torque sensors, such as a bit torque sensor 170d, may also be included in the BHA 170 for sending data to a controller 190 that is indicative of the torque applied to the bit 175.

The apparatus 100 may additionally or alternatively include a toolface sensor 170e configured to estimate or detect the current toolface orientation or toolface angle. The toolface sensor 170c may be or include a conventional or future-developed gravity toolface sensor which detects toolface orientation relative to the Earth's gravitational field. Alternatively, or additionally, the toolface sensor 170c may be or include a conventional or future-developed magnetic toolface sensor which detects toolface orientation relative to magnetic north or true north. In an example embodiment, a magnetic toolface sensor may detect the current toolface when the end of the wellbore is less than about 7° from vertical, and a gravity toolface sensor may detect the current toolface when the end of the wellbore is greater than about 7° from vertical. However, other toolface sensors may also be utilized within the scope of the present disclosure, including non-magnetic toolface sensors and non-gravitational inclination sensors. The toolface sensor 170c may also, or alternatively, be or include a conventional or future-developed gyro sensor. The apparatus 100 may additionally include a WOB sensor 170f integral to the BHA 170 and configured to detect WOB at or near the BHA 170, a torque on bit ("TOB") sensor integral to the BHA and configured to detect TOB at or near the BHA 170, a bend on bit ("BOB") sensor integral to the BHA 170 and configured to detect BOB at or near the BHA 170, and other yet to be defined sensors measuring downhole drilling data. The apparatus 100 may additionally or alternatively include an inclination sensor 170g integral to the BHA 170 and configured to detect inclination at or near the BHA 170. The apparatus 100 may additionally or alternatively include an azimuth sensor 170h integral to the BHA 170 and configured to detect azimuth at or near the BHA 170. The apparatus 100 may additionally or alternatively include a torque sensor 140a coupled to or otherwise associated with the top drive 140. The torque sensor 140a may be configured to detect a value or range of the torsion of the quill 145 and/or the drill string 155 (e.g., in response to operational forces acting on the drill string). In some embodiments, a torque sensor that is similar or identical to the torque sensor 140a is located in, or associated with, the BHA 170 to measure torque at the bit. The top drive 140 may additionally or alternatively include or otherwise be associated with a speed sensor 140b configured to detect a value or range of the rotational speed of the quill 145. In some embodiments, a speed sensor that is similar or identical to the speed sensor 140b is located in, or associated with, the BHA 170 to measure the rotation speed at the bit. In some embodiments, the torque sensor and the speed sensor associated with the BHA 170 are used to assess how well the torque is being transmitted to the drill bit and the actual rotation speed and torsional vibration or stick-slip there is at the bit. In some embodiments, the BHA 170 also includes another directional sensor 170i (e.g., azimuth, inclination, toolface, combination thereof, etc.) that is spaced along the BHA 170 from one or another directional sensor (e.g., the inclination sensor 170g, the azimuth sensor 170h). For example, and in some embodiments, the sensor 170i is positioned in the MWD 176 and the another directional sensor is positioned in the adjustment mechanism 179, with a known distance between them, for example 20 feet, configured to estimate or detect the current toolface orientation or toolface angle. The sensors 170a-170j are not limited to the arrangement illustrated in FIG. 1 and may be spaced along the BHA 170 in a variety of configurations.

The top drive 140, the draw works 130, the crown block 115, the traveling block 120, drilling line or dead line anchor may additionally or alternatively include or otherwise be associated with a WOB or hook load sensor 140c (WOB calculated from the hook load sensor that can be based on active and static hook load) (e.g., one or more sensors installed somewhere in the load path mechanisms to detect and calculate WOB, which can vary from rig-to-rig) different from the WOB sensor 170f. The WOB sensor 140f may be configured to detect a WOB value or range, where such detection may be performed at the top drive 140, the draw works 130, or other component of the apparatus 100. Generally, the hook load sensor 140c detects the load on the hook 135 as it suspends the top drive 140 and the drill string 155.

The detection performed by the sensors described herein may be performed once, continuously, periodically, and/or at random intervals. The detection may be manually triggered by an operator or other person accessing a human-machine interface ("HMI") or GUI, or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

In some embodiments, the controller 180 is configured to control or assist in the control of one or more components of the apparatus 100. For example, the controller 180 may be configured to transmit operational control signals to the controller 190, the draw works 130, the top drive 140, other components of the BHA 170 such as the adjustment mechanism 179, and/or the pump 181. The controller 180 may be a stand-alone component that forms a portion of the BHA 170 or be integrated in the adjustment mechanism 179 or another sensor that forms a portion of the BHA 170. The controller 180 may be configured to transmit the operational control signals or instructions to the draw works 130, the top drive 140, other components of the BHA 170, and/or the pump 181 via wired or wireless transmission means which, for the sake of clarity, are not depicted in FIG. 1.

The apparatus 100 also includes the controller 190 configured to control or assist in the control of one or more components of the apparatus 100. For example, the controller 190 may be configured to transmit operational control signals to the draw works 130, the top drive 140, the BHA 170 and/or the pump 181. The controller 190 may be a stand-alone component installed near the mast 105 and/or other components of the apparatus 100. In an example embodiment, the controller 190 includes one or more systems located in a control room proximate the mast 105, such as the general purpose shelter often referred to as the "doghouse" serving as a combination tool shed, office, communications center, and general meeting place. The controller 190 may be configured to transmit the operational control signals to the draw works 130, the top drive 140, the BHA 170, and/or the pump 181 via wired or wireless transmission means which, for the sake of clarity, are not depicted in FIG. 1.

Generally, the controller 190 is operably coupled to or includes a GUI. The GUI includes an input mechanism for user-inputs. The input mechanism may include a touch-screen, keypad, voice-recognition apparatus, dial, button, switch, slide selector, toggle, joystick, mouse, data base and/or other conventional or future-developed data input device. Such input mechanism may support data input from local and/or remote locations. In general, the input mechanism and/or other components within the scope of the present disclosure support operation and/or monitoring from stations on the rig site as well as one or more remote locations with a communications link to the system, network, local area network ("LAN"), wide area network ("WAN"), Internet, satellite-link, and/or radio, among other means. The GUI may also include a display for visually presenting information to the user in textual, graphic, or video form. For example, the input mechanism may be integral to or otherwise communicably coupled with the display. The GUI and the controller 190 may be discrete components that are interconnected via wired or wireless means. Alternatively, the GUI and the controller 190 may be integral components of a single system or controller. The controller 190 is configured to receive electronic signals via wired or wireless transmission means (also not shown in FIG. 1) from a plurality of the sensors 170a-170j, 130a, 140a-140b, 187, etc. that are included in the apparatus 100, where each sensor is configured to detect an operational characteristic or parameter. The controller 180 and/or the controller 190 control a drilling operation, such as a rotary steering operation. Often, the controller 180 and/or the controller 190 includes predetermined workflows, which include a set of computer-implemented instructions for executing a task from beginning to end, with the task being one that includes a repeatable sequence of steps that take place to implement the task. The controller 180 and/or the controller 190 generally implements the task of identifying drilling instructions. The controller 180 and/or the controller 190 also alters the drilling instructions and implements the drilling instructions to steer the BHA 170 along or towards the planned drilling path. In some embodiments, the controller 180 and/or the controller 190 identifies and/or alters the drilling instructions based on downhole data received from the plurality of sensors and the plurality of inputs. In some embodiments, the plurality of inputs includes the well plan input, a maximum WOB input, a maximum ROP input, a top drive input, a draw works input, a mud pump input, and equipment identification input. As shown, the controller 190 is configured to send signals to control the operation of the top drive 140, the mud pump 181, and the draw works 130. In some embodiments, a surface steerable system is formed by any one or more of: the plurality of sensors, the GUI, and the controller 180 and/or the controller 190.

In some embodiments, the controller 190 is not operably coupled to the top drive 140, but instead may include other drive systems, such as a power swivel, a rotary table, a coiled tubing unit, a downhole motor, and/or a conventional rotary rig, among others.

In some embodiments, the controller 190 controls the flow rate and/or pressure of the output of the mud pump 181.

In some embodiments, the controller 190 controls the feed-out and/or feed-in of the drilling line 125, rotational control of the draw works (in v. out) to control the height or position of the hook 135, and may also control the rate the hook 135 ascends or descends. However, example embodiments within the scope of the present disclosure include those in which the draw works-drill-string-feed-off system may alternatively be a hydraulic ram or rack and pinion type hoisting system rig, where the movement of the drill string 155 up and down is via something other than the draw works 130. The drill string 155 may also take the form of coiled tubing, in which case the movement of the drill string 155 in and out of the hole is controlled by an injector head which grips and pushes/pulls the tubing in/out of the hole. Nonetheless, such embodiments may still include a version of the draw works controller, which may still be configured to control feed-out and/or feed-in of the drill string 155.

Generally, the apparatus 100 also includes a hook position sensor that is configured to detect the vertical position of the hook 135, the top drive 140, and/or the travelling block 120. The hook position sensor may be coupled to, or be included in, the top drive 140, the draw works 130, the crown block 115, and/or the traveling block 120 (e.g., one or more sensors installed somewhere in the load path mechanisms to detect and calculate the vertical position of the top drive 140, the travelling block 120, and the hook 135, which can vary from rig-to-rig). The hook position sensor is configured to detect the vertical distance the drill string 155 is raised and lowered, relative to the crown block 115. In some embodiments, the hook position sensor is a draw works encoder, which may be the ROP sensor 130a. In some embodiments, the apparatus 100 also includes a rotary RPM sensor that is configured to detect the rotary RPM of the drill string 155. This may be measured at the top drive 140 or elsewhere, such as at surface portion of the drill string 155. In some embodiments, the apparatus 100 also includes a quill position sensor that is configured to detect a value or range of the rotational position of the quill 145, such as relative to true north or another stationary reference. In some embodiments, the apparatus 100 also includes a pump pressure sensor that is configured to detect the pressure of mud or fluid that powers the BHA 170 at the surface or near the surface. In some embodiments, the apparatus also includes a MSE sensor that is configured to detect the MSE representing the amount of energy required per unit volume of drilled rock. In some embodiments, the MSE is not directly sensed, but is calculated based on sensed data at the controller 190 or other controller. In some embodiments, the apparatus 100 also includes a bit depth sensor that detects the depth of the bit 175.

Figure 2:
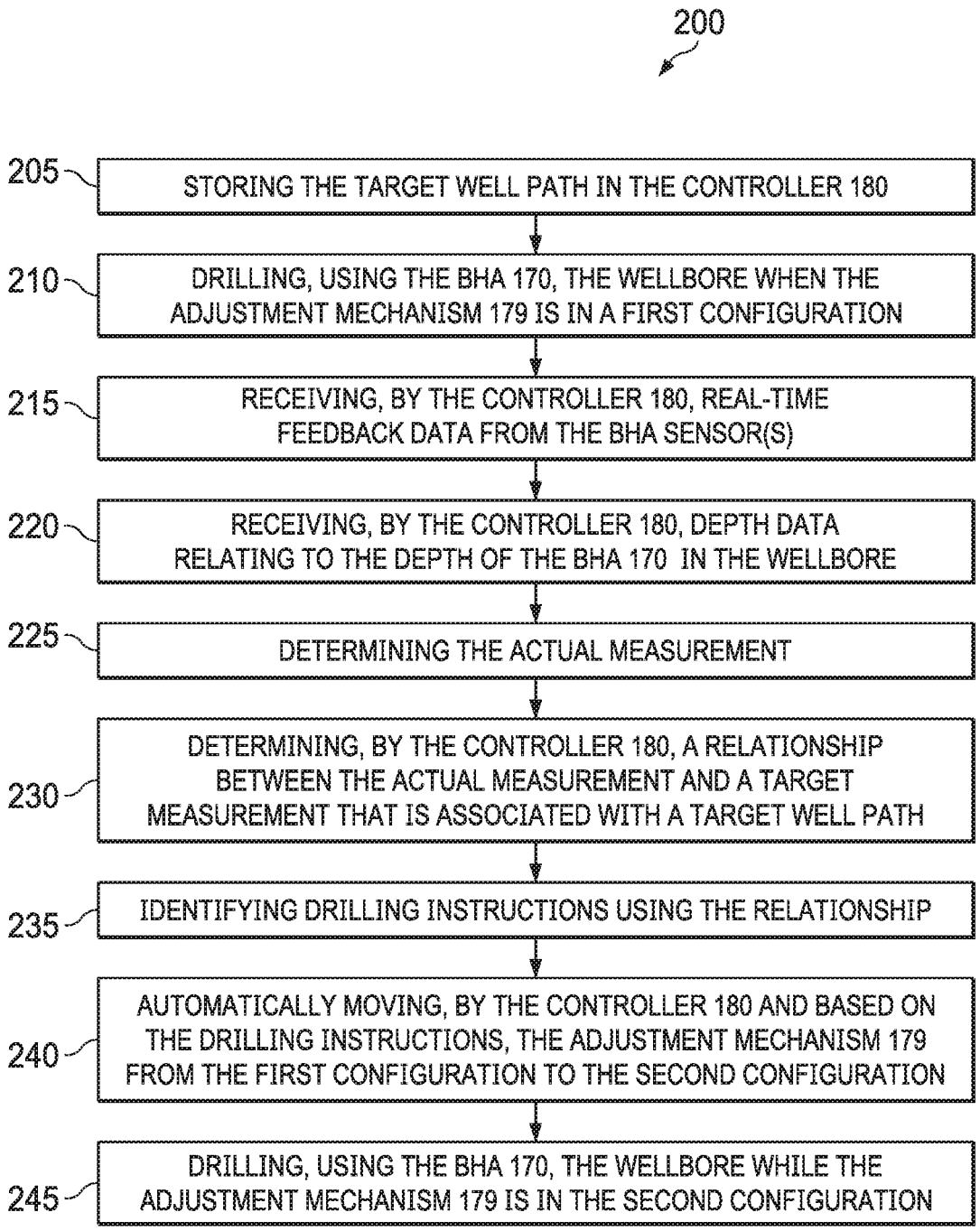
FIG. 2 is a flow-chart diagram of a method according to one or more aspects of the present disclosure.

In an example embodiment, as illustrated in FIG. 2 with continuing reference to FIG. 1, a method 200 of operating the apparatus 100 includes storing target well path data in the controller 180 or 190 at step 205; drilling, using the BHA 170, the wellbore when the adjustment mechanism 179 is in a first configuration at step 210; receiving, by the controller 180, real-time feedback data from the BHA sensor(s) at step 215; receiving, by the controller 180, depth data relating to the depth of the BHA 170 in the wellbore at step 220; determining, by the controller 180 and based on the real-time feedback data, an actual measurement at step 225; determining, by the controller 180, a relationship between the actual measurement and a target measurement that is associated with a target well path at step 230; identifying drilling instructions using the relationship at step 235; automatically moving, by the controller 180 and based on the drilling instructions, the adjustment mechanism from the first configuration to the second configuration at step 240; and drilling, using the BHA 170, the wellbore while the adjustment mechanism is in the second configuration at step 245.

At the step 205, the target well path data is stored in the controller 180. The target well path data may be received by the controller 180 via a wired or a wireless connection to another computing device, or via any other means.

At the step 210, the wellbore is drilled using the BHA 170 while the adjustment mechanism 179 is in the first configuration.

At the step 215, real-time feedback is received from the BHA sensor(s) and by the controller 180. In some embodiments, the BHA sensor(s) include any one or more of the sensors 170a-170j and any sensors in the MWD 176. In some embodiments, the real-time feedback includes any one or more of inclination angle data, azimuth angle data, lithologic related data, etc.

At the step 220, depth data relating to the depth of the BHA 170 is received by the controller 180. In one embodiment, and during the drilling process, the current depth or most recently calculated depth can be supplied to the BHA 170. In one embodiment, depth data from a sensor that continually tracks depth, incremental depth and/or ROP, or the depth and ROP is downlinked to the controller 180 from the surface either continuously or frequently enough to be sufficient for maintaining accurate well position. In other embodiments, a downhole sensor that tracks depth, incremental depth and/or ROP, or the depth and ROP sends the depth data relating to the depth of the BHA 170 to the controller 180 directly. That is, in some embodiments, the depth data is not uplinked to the surface prior to being received by the controller 180.

At the step 225, the controller 180 determines, based on the real-time feedback data, an actual measurement. In some embodiments, the actual measurement is an actual turn rate, and actual build rate, and actual depth, and actual well position or actual well path, etc. In some embodiments, the actual measurement is determined based on the real-time feedback alone while in other embodiments the actual measurement is further based on the depth data. For example, and in some embodiments, the two sensor readings from the BHA sensors can be compared continuously to generate a value of the actual turn rate and actual build rate, both of which are actual measurements. That is, when the BHA sensor(s) include a first sensor and a second sensor spaced along a longitudinal axis of the BHA 170, the method 200 also includes comparing, by the controller 180, the real-time feedback data from the first sensor and the real-time feedback data from the second sensor to determine a difference; and determining, by the controller 180 and using the difference, the actual measurement. In some embodiments, the controller 180 computes the actual well position and/or the actual well path, both of which are actual measurements.

At the step 230, the controller 180 determines a relationship between the actual measurement and a target measurement that is associated with the target well path. In some embodiments, the target measurement is a target inclination angle, a target azimuth angle, a target build rate, and/or target turn rate, and the actual measurement is an actual inclination angle, an actual azimuth angle, and an actual build rate, and/or an actual turn rate achieved by the BHA 170. In some embodiments, the relationship can be computed in real time. In some embodiments, an algorithm continuously calculates the relationship between the actual measurement and the target measurement. In some embodiments, the algorithm will continuously update a table or function that describes the relationship based on historical data from drilling similar conditions and on live data collected as the drilling progresses (e.g., the real-time feedback data). Generally, the relationship will change with the design of the BHA 170, the formation through which the BHA 170 extends, the WOB, the RPM, the ROP, the type of drill bit 175 and more. Thus, in some embodiments, determining the relationship or monitoring the relationship allows for future drilling instructions to be calibrated based on the relationship, therefore resulting in an actual measurement that more closely aligns with the target measurement.

At the step 235, drilling instructions are identified based on the relationship. In some embodiments, the drilling instructions are altered or created in response to the relationship, to maintain the well path within a tolerance window through which the target well path extends. Thus, and in some embodiments, the relationship is used to calibrate steering or drilling instructions.

At the step 240, the adjustment mechanism 179 is moved from the first configuration to the second configuration by the controller 180 in accordance with the drilling instructions, which are based on the relationship. In some embodiments, the steps 205-240 occur automatically without operator intervention or approval, while in other embodiments the operator can approve of suggested instructions or the operator can create his or her own instructions. For example, and in the event the well position drifts out of acceptable range, a flag can be transmitted to the operator and if required mitigating action taken by the operator.

At the step 245, the wellbore is drilled using the BHA 170 while the adjustment mechanism 179 is in the second configuration. Often, drilling the wellbore while the adjustment mechanism is in the second configuration steers the BHA 170 towards or along the target well path.

In some embodiments, the BHA sensors include Gamma Ray ("GR"), Azimuthal GR, spectral GR or other lithological sensors and this data can be used to identify geological markers. These actual geological markers can be compared with target geological markers that are associated with specific points along the target well path. When there is a difference, for instance the target GR level in the plan shows a significant change, and the actual GR does not change, then either a flag is raised to bring the operator's attention to this change and let him or her decide if the well plan should be changed, or the apparatus 100 could automatically adjust the well path and match the path to the actual formation. That is, in some embodiments and when the real-time feedback data includes lithologic related data, the actual measurement includes an actual lithology measurement of a formation through which the wellbore extends, and the target measurement includes a target lithology associated with a portion of the target well path. In this instance, drilling the wellbore while the adjustment is in the second configuration includes moving the BHA towards a revised target well path that is based on the actual lithology measurement and the target lithology. In some embodiments, lithologic related data includes geologic data and/or formation data.

In some embodiments, the BHA sensor(s), the adjustment mechanism 179, and the controller 180 form a first closed-loop control system in which the input is the target inclination angle and a second closed-loop control system in which the input is the target azimuth angle. Thus, in some embodiments, using the method 200 and/or the apparatus 100, any individual aspect (or combination thereof) of steering, turning left and right, or changing the inclination is set up in a closed loop mode. In some embodiments and when set in closed loop mode, the azimuth is set as a target and the RSS will continuously target the azimuth using a closed loop with a regulator, for example a PID regulator (Proportional Integral Derivative) or logic rules, to steer and to maintain a heading. If it is pushed "off course" for any reason, the apparatus 100 will try to steer back. In closed loop inclination control, the inclination target will be set and then the RSS will steer towards the target using a build up rate that can be varied to suit the plan. Typically, the build up rate and turn rate setting can be estimated, based on the known performance of the system, but the actual build rate and turn rate will depend on the geology and drilling parameters and therefore may need adjusting from time to time.

In some embodiments, the controller 190 determines that the adjustment mechanism 179 should move between the first and second configurations. In this instance, the controller 190 automatically downlinks, to the controller 180, instructions to move the adjustment mechanism 179 between the first configuration and the second configuration. That is, in some embodiments the real-time feedback data is sent to the controller 190, and the controller 190 forms the first closed-loop control system and the second closed-loop control system.

Thus, in some embodiments, using the method 200 and/or the apparatus 100, the BHA 170 quickly generates drilling instructions based on the relationship between previously implemented instructions and the results of those instructions. Thus, the actual well path will more closely align with the target well path, and wells that are spaced evenly apart rather than erratically spaced generally have improved productivity. The BHA 170, with the controller 180, allows for drilling instructions to be identified and implemented sooner than if the data was required to be relayed uphole, reviewed, and instructions to be implemented and downlinked from the surface.

Moreover, shock, vibration, whirl, stick-slip and other impacts will affect the BHA 170 in various ways. It may cause critical parts of the BHA 170, sensors, tools, mechanical assemblies, to fail, parts to break, drill-bits to fail, hole quality to deteriorate and if these conditions can be identified in real time then corrective action can be taken.

Quickly responding to real-time, unplanned drilling events often prevents equipment failure and/or well control issues. There are many aspects of the drilling process that are monitored by sensors downhole and at surface, for example, accelerometers in the BHA 170 measure shock and vibration in 3 axes, gyroscopes measure the BHA 170 rpm and torsional vibrations like stick-slip and whirl. Downhole strain sensors measure weight on bit, torque on bit and bend on bit, downhole pressure sensors measure pressure inside the drill string 155 and in the annulus and use this data to compute an Equivalent Circulating Density ("ECD"), which may identify if cuttings are packing off.

Figure 3:
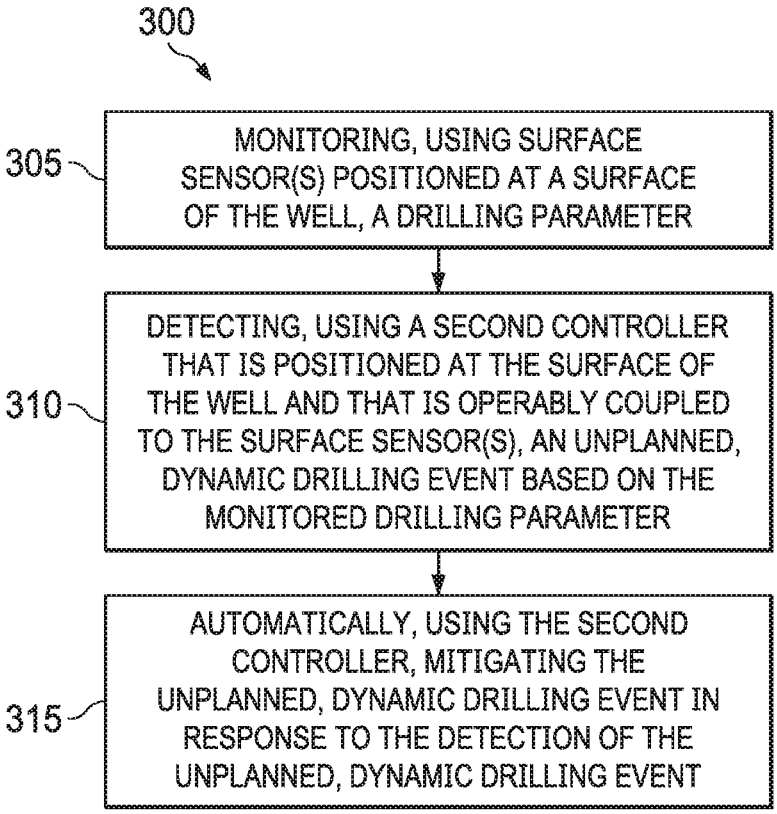
FIG. 3 is a flow-chart diagram of a method according to one or more aspects of the present disclosure.

In an example embodiment, as illustrated in FIG. 3 with continuing reference to FIGS. 1-2, a method 300 of operating the apparatus 100 includes monitoring, using surface sensor(s) positioned at a surface of the well, a drilling parameter at step 305, detecting, using the controller 190 that is positioned at the surface of the well and that is operably coupled to the surface sensor(s), an unplanned, dynamic drilling event based on the monitored drilling parameter at step 310; and automatically, using the controller 190, mitigating the unplanned, dynamic drilling event in response to the detection of the unplanned, dynamic drilling event at step 315.

At the step 305, the surface sensors monitor a drilling parameter at a surface of the wellbore. In some embodiments, the drilling parameters include torque, vibration readings, top drive or Kelly movement, etc.

At the step 310, the controller 190 detects, based on the monitored drilling parameters and the continuous feedback data from the BHA sensors, an unplanned, dynamic drilling event.

At the step 315, the controller 190 automatically and in response to the detection of the unplanned, dynamic drilling event, mitigates the unplanned, dynamic drilling event. In some embodiments, mitigating the unplanned, dynamic drilling event includes lifting, using the controller 190, the drill string 155 that is coupled to the BHA 170 to lift the BHA 170 off a bottom of the wellbore; repetitively moving, using the controller 190, the pipe vertically and/or rotationally while the BHA 170 is lifted off bottom; and lowering, using the controller 190, the drill string 155 such that the BHA 170 touches the bottom of the well bore.

Figure 5:
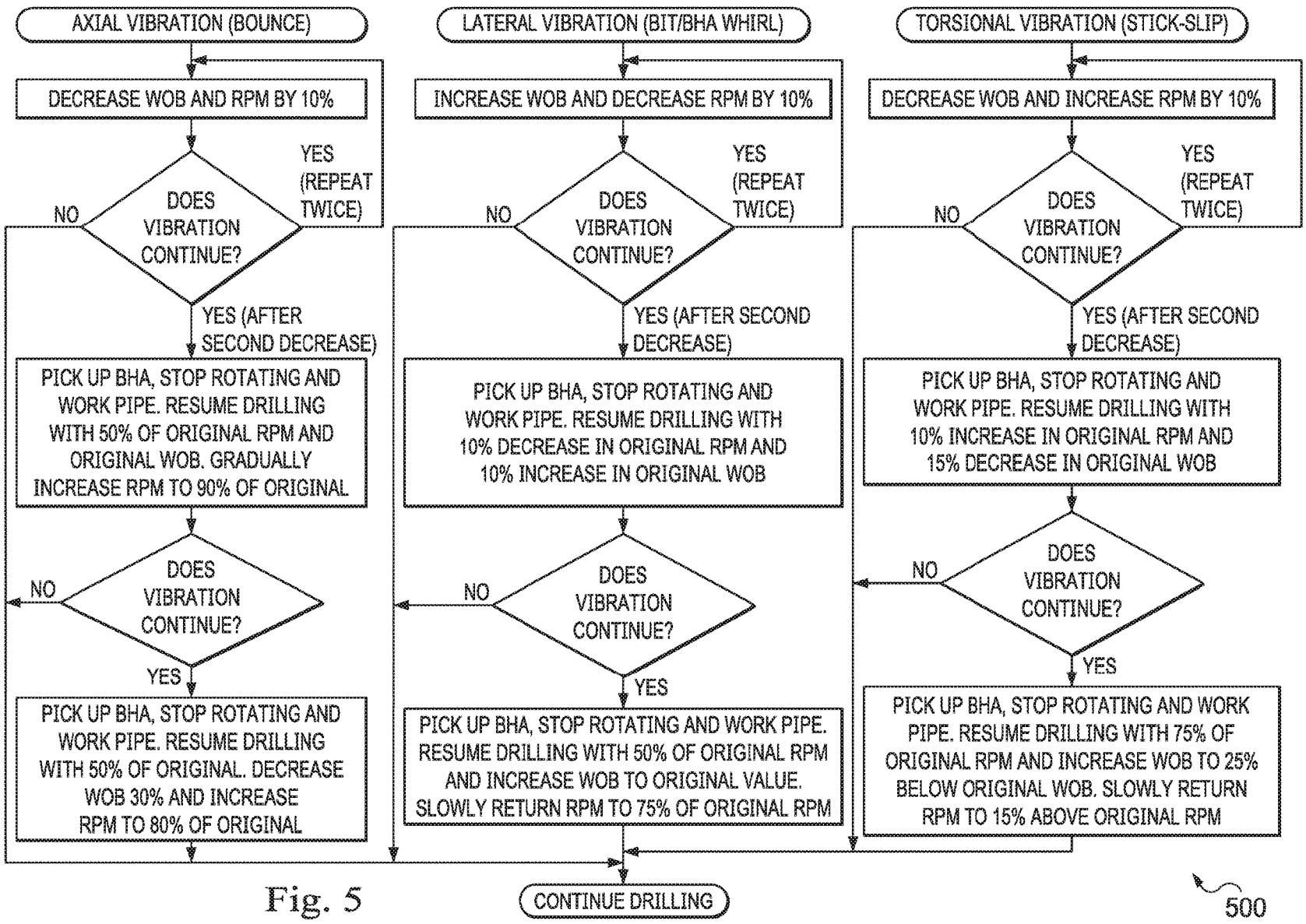
FIG. 5 is a flow-chart diagram of a method according to one or more aspects of the present disclosure.

Each of the table 400 illustrated in FIG. 4 and the flow chart 500 illustrated in FIG. 5 describes a decision-making process or flow chart for actions to be taken by the controller 190. In some embodiments, the steps are automated without drilling operator approval or intervention. However, in other embodiments the solution is presented to the drilling operator via the GUI and the drilling operator has the option of intervening only if he considers an alternative solution.

Thus, using the method 300 and/or the apparatus 100, the real-time, unplanned drilling events are quickly identified and resolved, which reduces the likelihood or frequency of equipment failure and/or well control issues.

Methods within the scope of the present disclosure may be local or remote in nature. These methods, and any controllers discussed herein, may be achieved by one or more intelligent adaptive controllers, programmable logic controllers, artificial neural networks, and/or other adaptive and/or "learning" controllers or processing apparatus. For example, such methods may be deployed or performed via PLC, PAC, PC, one or more servers, desktops, handhelds, and/or any other form or type of computing device with appropriate capability.

The term "about," as used herein, should generally be understood to refer to both numbers in a range of numerals. For example, "about 1 to 2" should be understood as "about 1 to about 2." Moreover, all numerical ranges herein should be understood to include each whole integer, or 1/10 of an integer, within the range.

Figure 6:
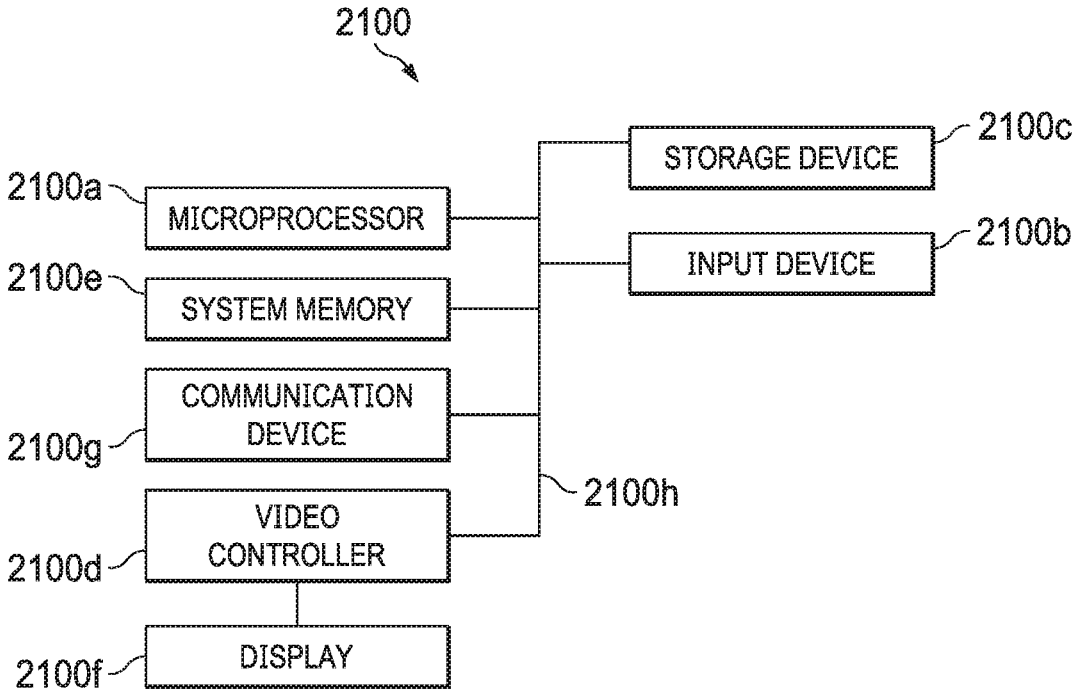
FIG. 6 is a diagrammatic illustration of a node for implementing one or more example embodiments of the present disclosure, according to an example embodiment.

In an example embodiment, as illustrated in FIG. 6 with continuing reference to FIGS. 1-5, an illustrative node 2100 for implementing one or more embodiments of one or more of the above-described networks, elements, methods and/or steps, and/or any combination thereof, is depicted. The node 2100 includes a microprocessor 2100a, an input device 2100b, a storage device 2100c, a video controller 2100d, a system memory 2100e, a display 2100f, and a communication device 2100g all interconnected by one or more buses 2100h. In several example embodiments, the storage device 2100c may include a floppy drive, hard drive, CD-ROM, optical drive, any other form of storage device and/or any combination thereof. In several example embodiments, the storage device 2100c may include, and/or be capable of receiving, a floppy disk, CD-ROM, DVD-ROM, or any other form of computer-readable non-transitory medium that may contain executable instructions. In several example embodiments, the communication device 2100g may include a modem, network card, or any other device to enable the node to communicate with other nodes. In several example embodiments, any node represents a plurality of interconnected (whether by intranet or Internet) computer systems, including without limitation, personal computers, mainframes, PDAs, tablets and cell phones.

In several example embodiments, one or more of the controller 190, the controller 180, the GUI 195, and any of the sensors, includes the node 2100 and/or components thereof, and/or one or more nodes that are substantially similar to the node 2100 and/or components thereof.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, a database may be any standard or proprietary database software, such as Oracle, Microsoft Access, SyBase, or DBase II, for example. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, while different steps, processes, and procedures are described as appearing as distinct acts, one or more of the steps, one or more of the processes, and/or one or more of the procedures could also be performed in different orders, simultaneously and/or sequentially. In several example embodiments, the steps, processes and/or procedures could be merged into one or more steps, processes and/or procedures.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," "front-to-back," etc., are for the purpose of illustration only and do not limit the specific orientation or location of the structure described above.

In several example embodiments, one or more of the operational steps in each embodiment may be omitted or rearranged. For example, the step 515 may occur prior to or simultaneously with the step 510. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of drilling a wellbore using a rotary steerable system that comprises a bottom hole assembly ("BHA") that comprises an adjustment mechanism, BHA sensor(s), and a first controller, the method comprising:

drilling, using the BHA, the wellbore when the adjustment mechanism is in a first configuration;

wherein the adjustment mechanism is movable between at least the first configuration and a second configuration [to alter a drilling direction of the BHA];

receiving, by the first controller, real-time feedback data from the BHA sensor(s);

[wherein the real-time feedback data includes inclination angle data and azimuth angle data;]

determining, by the first controller and based on the real-time feedback data, a relationship between an actual measurement derived from the real-time feedback data and a target measurement [that is associated with a target well path];

[wherein the actual measurement comprises an actual inclination angle and an actual azimuth angle; and wherein the target measurement comprises a target inclination angle and a target azimuth angle;]

*monitoring, continuously using an algorithm, by the first controller, and based on the real-time feedback data, the relationship between the actual measurement derived from the real-time feedback data and the target measurement;*

*determining, by the first controller and based on the continuous monitoring of the relationship between the actual measurement derived from the real-time feedback data and the target measurement, an updated relationship between the actual measurement derived from the real-time feedback data and the target measurement; and*

*revising, by the first controller and based on the updated relationship between the actual measurement derived from the real-time feedback data and the target measurement, drilling instructions associated with a target well path to create revised drilling instructions associated with a revised target well path;* automatically moving, by the first controller and in response to the determination of the *updated* relationship *between the actual measurement derived from the real-time feedback data and the target measurement and in response to the creation of the revised drilling instructions associated with the revised target well path*, the adjustment mechanism from the first configuration to the second configuration; and drilling, using the BHA, the wellbore while the adjustment mechanism is in the second configuration.

2. The method of claim 1, wherein the BHA sensor(s), the adjustment mechanism, and the first controller form a first closed-loop control system in which the input is the target [inclination angle and a second closed-loop control system in which the input is the target azimuth angle] *measurement*.

3. The method of claim 1,

*wherein the target measurement is associated with the target well path;* wherein the actual measurement is an actual position and the target measurement is a target position; and wherein the method further comprises:

storing the target well path in the first controller;

*storing the revised target well path in the first controller;* receiving, by the first controller, depth data relating to the depth of the BHA in the wellbore; and determining the actual position based on the depth data and the real-time feedback data from the BHA sensor(s);

wherein the actual position [further] comprises an actual build rate and an actual turn rate; and wherein the target position [further] comprises a target build rate and a target turn rate.

4. The method of claim [1] *3*, wherein drilling the wellbore while the adjustment mechanism is in the second configuration comprises moving the BHA towards the *revised* target well path.

5. The method of claim 1,

*wherein the target measurement is associated with the target well path;* wherein the real-time feedback data [further] comprises lithologic related data;

wherein the actual measurement [further] comprises an actual lithology measurement of a formation through which the wellbore extends;

wherein the target measurement [further] comprises a target lithology associated with a portion of the target well path;

and wherein drilling the wellbore while the adjustment mechanism is in the second configuration [further] comprises moving the BHA towards [a] *the* revised target well path that is based on the actual lithology measurement and the target lithology.

6. The method of claim 1, further comprising:

monitoring a drilling parameter using surface sensor(s) positioned at or near a surface of a well that is associated with the wellbore;

identifying a drilling event based on the monitored drilling parameter, using a second controller that is positioned at the surface and that is operably coupled to the surface sensor(s); and automatically, using the second controller, mitigating the drilling event in response to the identification of the drilling event.

7. The method of claim 3, wherein the BHA sensor(s) comprise:

a first sensor configured to detect inclination angle data; and a second sensor configured to detect data relating to a distance travelled by the BHA;

wherein receiving, by the first controller, real-time feedback data from the BHA sensor(s) comprises receiving the inclination angle data from the first sensor and receiving the data relating to the distance travelled by the BHA from the second sensor;

wherein the method further comprises:

calculating, by the first controller, and based on the data relating to the distance travelled by the BHA, a distance travelled by the BHA; and calculating, by the first controller, and based on the distance travelled by the BHA and the inclination angle data, an actual dogleg severity.

8. The method of claim 1, wherein a second controller is positioned at or near a surface of a well that is associated with the wellbore;

wherein the method further comprises:

determining, by the second controller, that the adjustment mechanism should move between the first and second configurations; and automatically downlinking in response to the determination, from the second controller to the first controller, instructions to move the adjustment mechanism between the first configuration and the second configuration.

[9. The method of claim 1, further comprising continuously determining using an algorithm, by the first controller and based on the real-time feedback data, the relationship between the actual measurement and the target measurement.]

10. The method of claim 3, wherein the BHA sensor(s) comprise a first sensor and a second sensor spaced along a longitudinal axis of the BHA;

wherein the method further comprises:

comparing, by the first controller, the real-time feedback data from the first sensor and the real-time feedback data from the second sensor to determine a difference; and determining, by the first controller and using the difference, the actual position.

11. An apparatus adapted to drill a wellbore comprising:

a bottom hole assembly ("BHA") that comprises:

an adjustment mechanism that is movable between at least a first configuration and a second configuration [to alter a drilling direction of the BHA];

BHA sensor(s) that monitor real-time feedback data [that comprises inclination angle data and azimuth angle data], and a first controller in communication with the BHA sensor(s);

wherein the first controller is configured to:

receive the [inclination angle data and the azimuth angle data] *real-time feedback data* from the BHA sensor(s);

determine, based on the [inclination angle data and the azimuth angle data] *real-time feedback data*, a relationship between an actual measurement derived from the real-time feedback data and a target measurement [that is associated with a target well path;

wherein the actual measurement comprises an actual inclination angle and an actual azimuth angle; and wherein the target measurement comprises a target inclination angle and a target azimuth angle;]

*monitor, continuously using an algorithm, by the first controller, and based on the real-time feedback data, the relationship between the actual measurement derived from the real-time feedback data and the target measurement;*

*determine, by the first controller and based on the continuous monitoring of the relationship between the actual measurement derived from the real-time feedback data and the target measurement, an updated relationship between the actual measurement derived from the real-time feedback data and the target measurement; and*

*revise, by the first controller and based on the updated relationship between the actual measurement derived from the real-time feedback data and the target measurement, drilling instructions associated with a target well path to create revised drilling instructions associated with a revised target well bath;*

*and* automatically move, in response to the determination of the *updated* relationship *between the actual measurement derived from the real-time feedback data and the target measurement and in response to the creation of the revised drilling instructions associated with the revised target well path*, the adjustment mechanism from the first configuration to the second configuration [to alter a drilling direction of the BHA].

12. The apparatus of claim 11, wherein the BHA sensor(s), the adjustment mechanism, and the first controller form a first closed-loop control system in which the input is the target [inclination angle and a second closed-loop control system in which the input is the target azimuth angle] *measurement*.

13. The apparatus of claim 11,

*wherein the target measurement is associated with the target well path;* wherein the actual measurement is an actual position and the target measurement is a target position; and wherein the first controller is further configured to:

store the target well path;

*store the revised target well path;* receive depth data relating to the depth of the BHA in the wellbore; and determine the actual position based on the depth data and the real-time feedback data from the BHA sensor(s);

wherein the actual position [further] comprises an actual build rate and an actual turn rate; and wherein the target position [further] comprises a target build rate and a target turn rate.

14. The apparatus of claim [11] *13*, wherein drilling the wellbore while the adjustment mechanism is in the second configuration comprises moving the BHA towards the target well path.

15. The apparatus of claim 11,

*wherein the target measurement is associated with the target well path;* wherein the real-time feedback data further comprises lithologic related data;

wherein the actual measurement [further] comprises an actual lithology measurement of a formation through which the wellbore extends;

wherein the target measurement [further] comprises a target lithology associated with a portion of the target well path;

and wherein the first controller is further configured to automatically move, in response to the determination of the *updated* relationship, the adjustment mechanism from the first configuration to the second configuration to alter a drilling direction of the BHA towards [a] *the* revised target well path that is based on the actual lithology measurement and the target lithology.

16. The apparatus of claim 11, further comprising:

a surface sensor(s) positioned at or near a surface of a well that is associated with the wellbore, wherein the surface sensor(s) and/or the BHA sensors(s) is configured to monitor a drilling parameter; and a second controller that is positioned at the surface and that is in communication with the surface sensor(s), wherein the second controller is configured to detect a drilling event based on the monitored drilling parameter.

17. The apparatus of claim 11, wherein the BHA sensor(s) comprise:

a first sensor configured to detect inclination angle data; and a second sensor configured to detect data relating to a distance travelled by the BHA;

wherein the first controller is further configured to:

receive the data relating to the distance travelled by the BHA from the second sensor;

calculate, based on the data relating to the distance travelled by the BHA, a distance travelled by the BHA; and calculate, based on the distance travelled by the BHA and the inclination angle data, an actual dogleg severity.

18. The apparatus of claim 11, further comprising:

a second controller that is positioned at or near a surface of a well that is associated with the wellbore, wherein the second controller is configured to:

determine that the adjustment mechanism should move between the first and second configurations; and automatically downlink in response to the determination, from the second controller to the first controller, instructions to move the adjustment mechanism between the first configuration and the second configuration.

[19. The apparatus of claim 11, wherein the first controller is further configured to continuously determine, using an algorithm and based on the real-time feedback data, the relationship between the actual measurement and the target measurement.]

20. The apparatus of claim 13, wherein the BHA sensor(s) comprise a first sensor and a second sensor spaced along a longitudinal axis of the BHA;

wherein the first controller is further configured to:

compare the real-time feedback data from the first sensor and the real-time feedback data from the second sensor to determine a difference; and determine, using the difference, the actual position.

21. The method of claim 1, further comprising:

monitoring a drilling parameter using the BHA sensor(s);

identifying a drilling event based on the monitored drilling parameter, using a second controller that is positioned at the surface and that is operably coupled to surface sensor(s) positioned at or near a surface of a well that is associated with the wellbore; and automatically, using the second controller, mitigating the drilling event in response to the identification of the drilling event.

22. The method of claim 8, further comprising:

receiving, by the second controller, the real-time feedback data from the BHA sensor(s) and depth data that is associated with the real-time feedback data;

*wherein the target measurement is associated with the target well path;* wherein determining, by the second controller, that the adjustment mechanism should move between the first and second configurations comprises:

determining, by the second controller and based on the depth data and the real-time feedback data, a projected well path; and determining, by the second controller, a difference between the projected well path and the *revised* target well path;

wherein the determination that the adjustment mechanism should move between the first and second configurations is based on the difference between the projected well path and the *revised* target well path;

wherein the automatic downlinking, from the second controller to the first controller, occurs without approval from a drilling operator; and wherein the rotary steerable system forms a closed-loop control system that continuously:

receives the real-time feedback data from the BHA sensor(s) and the depth data that is associated with the real-time feedback data; determines the difference[;] between the projected well path and the *revised* target well path; and automatically moves the adjustment mechanism in response to the difference.

*23. The method of claim 1,*

*wherein the real-time feedback data includes inclination angle data and azimuth angle data;*

*wherein the actual measurement comprises an actual inclination angle and an actual azimuth angle; and*

*wherein the target measurement comprises a target inclination angle and a target azimuth angle.*

*24. The method of claim 23, wherein the BHA sensor(s), the adjustment mechanism, and the first controller form a first closed-loop control system in which the input is the target inclination angle and a second closed-loop control system in which the input is the target azimuth angle.*

*25. The method of claim 1, wherein the adjustment mechanism is movable between at least the first configuration and the second configuration to alter a drilling direction of the BHA and/or an angular deflection.*

*26. The method of claim 1, wherein the BHA sensor(s) comprise any one or more of:*

*a downhole annular pressure sensor;*

*a shock/vibration sensor;*

*a mud motor delta pressure sensor;*

*a bit torque sensor;*

*a toolface sensor;*
*a weight on bit sensor;*
*a torque on bit sensor;*
*a bend on bit sensor;*
*an inclination sensor;*
*a depth sensor;*
*an azimuth sensor; and*
*a speed sensor.*

*27. The method of claim 1, further comprising sending, by the first controller and in response to the determination of the updated relationship, control signals to a second controller that is positioned at the surface.*

*28. The method of claim 27, wherein the second controller is operably coupled to any one or more of:*
*a top drive;*
*a draw works; and*
*mud pump(s).*

*29. The apparatus of claim 11,*
*wherein the real-time feedback data includes inclination angle data and azimuth angle data;*
*wherein the actual measurement comprises an actual inclination angle and an actual azimuth angle; and*
*wherein the target measurement comprises a target inclination angle and a target azimuth angle.*

*30. The apparatus of claim 29, wherein the BHA sensor(s), the adjustment mechanism, and the first controller form a first closed-loop control system in which the input is the target inclination angle and a second closed-loop control system in which the input is the target azimuth angle.*

*31. The apparatus of claim 11, wherein the adjustment mechanism is movable between at least the first configuration and the second configuration to alter a drilling direction of the BHA and/or an angular deflection.*

*32. The apparatus of claim 11, wherein the BHA sensor(s) comprise any one or more of:*
*a downhole annular pressure sensor;*
*a shock/vibration sensor;*
*a mud motor delta pressure sensor;*
*a bit torque sensor;*
*a toolface sensor;*
*a weight on bit sensor;*
*a torque on bit sensor;*
*a bend on bit sensor;*
*an inclination sensor;*
*a depth sensor;*
*an azimuth sensor; and*
*a speed sensor.*

*33. The apparatus of claim 11, wherein the first controller is further configured to, in response to the determination of the updated relationship, send control signals to a second controller that is positioned at the surface.*

*34. The apparatus of claim 33, wherein the second controller is operably coupled to any one or more of:*
*a top drive;*
*a draw works; and*
*mud pump(s).*

* * * * *